(12) United States Patent
Windslow et al.

(10) Patent No.: US 12,129,734 B2
(45) Date of Patent: Oct. 29, 2024

(54) BACK-UP RING SYSTEM FOR ELASTOMERIC SEALING ELEMENTS

(71) Applicant: Schlumberger Technology Corporation, Sugar Land, TX (US)

(72) Inventors: Richard James Windslow, Richmond, TX (US); Travis Wernecke, Alvin, TX (US); Mikhail Gotlib, Houston, TX (US); Henghua Jin, Sugar Land, TX (US); Karen Braden, Pearland, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/260,490

(22) PCT Filed: Dec. 22, 2021

(86) PCT No.: PCT/US2021/064959
§ 371 (c)(1),
(2) Date: Jul. 6, 2023

(87) PCT Pub. No.: WO2022/154952
PCT Pub. Date: Jul. 21, 2022

(65) Prior Publication Data
US 2024/0060386 A1 Feb. 22, 2024

Related U.S. Application Data

(60) Provisional application No. 63/136,623, filed on Jan. 12, 2021.

(51) Int. Cl.
*E21B 33/12* (2006.01)
*E21B 33/128* (2006.01)
*F16J 15/18* (2006.01)

(52) U.S. Cl.
CPC ...... *E21B 33/1216* (2013.01); *E21B 33/1208* (2013.01); *E21B 33/128* (2013.01); *F16J 15/18* (2013.01)

(58) Field of Classification Search
CPC ............. E21B 33/1216; E21B 33/1208; E21B 33/128; E21B 33/129; E21B 23/06; E21B 33/12; F16J 15/18; F16J 15/166
See application file for complete search history.

(56) References Cited

U.S. PATENT DOCUMENTS

| 3,036,639 A | 5/1962 | Baker |
| 4,611,658 A | 9/1986 | Salerni |

(Continued)

FOREIGN PATENT DOCUMENTS

| EP | 3445940 A2 | 2/2019 |
| WO | 2012045168 A1 | 4/2012 |

OTHER PUBLICATIONS

International Search Report and Written Opinion issued in PCT Application PCT/US2021/064959, dated Apr. 19, 2022 (10 pages).

*Primary Examiner* — Brad Harcourt
(74) *Attorney, Agent, or Firm* — Jeffrey D. Frantz

(57) ABSTRACT

A back-up ring system incudes an outer C-ring, an inner C-ring that mates with the outer C-ring, the inner C-ring including a first rupture port, and a ring sheath that fits onto the inner C-ring, the ring sheath including a cut-out region, and a second rupture point. The inner C-ring further includes a blocking segment that angularly offsets the first and second rupture points. The cut-out region of the ring sheath mates with the blocking segment of the inner C-ring. The ring sheath further incudes a '7' shaped cross-sectional profile.

16 Claims, 15 Drawing Sheets

(56) References Cited

U.S. PATENT DOCUMENTS

| | | |
|---|---|---|
| 6,598,672 B2 | 7/2003 | Bell et al. |
| 10,704,355 B2 | 7/2020 | Deng |
| 2002/0043368 A1 | 4/2002 | Bell |
| 2013/0306330 A1* | 11/2013 | Bishop ................ E21B 33/1293 166/387 |
| 2017/0191340 A1 | 7/2017 | Deng |
| 2019/0078414 A1* | 3/2019 | Frazier ................ E21B 34/063 |
| 2019/0112891 A1* | 4/2019 | Kellner ................ E21B 33/128 |
| 2019/0368304 A1 | 12/2019 | Deng |

\* cited by examiner

BACK-UP RING SYSTEM FOR ELASTOMERIC SEALING ELEMENTS

CROSS-REFERENCE TO RELATED APPLICATIONS

The present application is a National Stage Entry of International Application No. PCT/US2021/064959, filed Dec. 22, 2021, which claims priority benefit of U.S. Provisional Application No. 63/136,623, filed Jan. 12, 2021, the entirety of which is incorporated by reference herein and should be considered part of this specification.

BACKGROUND

In wellbore completions, downhole tools such as liner hangers and packers may include a sealing system in which an elastomer element is the critical sealing portion of the tool. During operation, the downhole tool is run inside a wellbore. Then, the elastomer element is axially deployed and compressed between two metal gauge rings on the mandrel of the downhole tool, causing the elastomer element to bulge radially outwards, thereby bridging the gap between the outer diameter of the downhole tool and the wellbore. Given that the elastomer element is developed to seal against high pressures, if the elastomer element does not have sufficient support in this gap region, then the elastomer element will extrude into the gap and consequently fail to form a seal. Accordingly, there is a need for a back-up ring system for elastomer sealing elements that prevents extrusion and provides a solid backing for the element so that the element may maintain a seal under high fluid pressures.

SUMMARY

According to one or more embodiments of the present disclosure, a back-up ring system includes an outer C-ring; an inner C-ring that mates with the outer C-ring, the inner C-ring including: a first rupture point; and a ring sheath that fits onto the inner C-ring, the ring sheath including: a cut-out region; and a second rupture point. According to one or more embodiments of the present disclosure, the inner C-ring further includes a blocking segment that angularly offsets the first and second rupture points, wherein the cut-out region of the ring sheath mates with the blocking segment of the inner C-ring, and wherein the ring sheath further includes a '7' shaped cross-sectional profile.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 2:
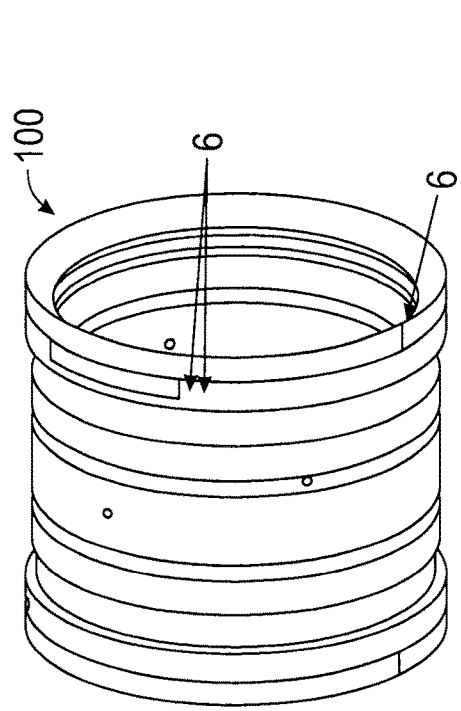
FIG. 2 is a perspective view of the tool shown in FIG. 1 according to one or more embodiments of the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to systems and methods that facilitate improved sealing of downhole tools. More specifically, one or more embodiments of the present disclosure relate to an elastomer element sealing system that can be used within multiple downhole tools, including a liner hanger or packer, for example. However, the elastomer element sealing system according to one or more embodiments of the present disclosure is not limited to downhole applications, and may retain functionality as an elastomer element sealing system wherever used.

One or more embodiments of the present disclosure is directed to an advanced back-up ring system for an elastomer element. There are various types of back-up system designs used for elastomer packing elements. These include foldback rings (FBRs), "V" profiled C-Rings, mesh rings, and garter springs etc. The two most common types of back-up ring systems in use with elastomeric elements are FBRs and 'V' profiled C-Rings. FBRs are thin but solid/slotted metal rings that deform with the elastomer element acting as a cap on the elastomeric sections. Secondly, 'V' profiled C-Rings are a pair of solid metal rings designed with a deliberate fracture point. Once enough force is put into the ring, the fracture point ruptures, allowing the ring to expand from a smaller '0' shape into a larger 'C' shape. By using a pair of mirrored C-Rings, the system can form a rough '0' shape for near total coverage at a larger radius. Together, the C-Rings form a 'V' shaped profile, which helps the axially applied load translate into radial expansion at the rings.

The benefit of FBRs is that they provide total anti-extrusion coverage for the system. However, they take a lot more energy to set compared to the C-Rings. FBRs are after all solid metal rings, and must plastically deform to reach the surrounding wellbore or casing. As they do not have an inherent rupture point, they remain intact through the setting process. Whereas the C-Ring sets by a change of geometric state (i.e., O-Ring to C-Ring) the FBRs set through pure elasto-plastic deformation. Expanding the metal ring out sufficiently to meet the surrounding wellbore or casing causes a large hoop strain component to arise, consuming a lot of energy from the system. This increased hoop strain can be detrimental to the elastomer element's performance. Elastomer elements are set with a limited amount of force. Thus, the more energy consumed within the back-up ring system, the less energy available for storage within the elastomer element, and hence, the less energy available that actually contributes towards sealing.

Another downside of foldback rings is that they continue to deform when the elastomer element system is put under differential pressure. This is known as coining. The continued deformation of the FBRs post-setting causes the elastomer element to lose sealing performance, as the FBRs' deformation acts to open up free space within the gland. In turn, this results in the elastomer element losing strain energy that was stored through setting, lessening the effective sealing performance of the elastomer element.

For packing elements, garter spring back-up systems have proven to be effective for relatively low pressure levels. However, garter spring back-up systems are unsuitable for high pressure applications as they only provide extrusion resistances at low pressures, whereas FBRs and C-Rings may be used at high pressures. Another concern with garter spring systems is manufacturing. The manufacturing cost for a garter spring element is quite high, as the spring must be molded into the elastomer element. Moreover, the elastomer element can only be manufactured through molding, and it cannot be machined from a slug. As such, it is difficult to fast prototype element designs with garter springs. On the contrary, FBR and C-Ring elements can be machined from a slug, which makes it relatively simple to fast prototype designs with systems that include such elements.

Elastomer elements with integrated metal mesh rings are generally limited to low-tier applications with relative low pressure differentials, as the mesh rings are found to provide limited anti-extrusion resistance. Similar to the stated drawbacks of the garter spring system, this type of back-up ring system may only be manufactured by molding the metal mesh ring and elastomer element together, which limits the flexibility for prototyping designs quickly and cheaply. Consequently, the manufacturing costs for such back-up ring systems are relatively high. Even so, both garter spring elements and mesh ring elements can be deployed quite quickly with relatively low setting force, as the rings do not require much energy to expand within their elastic region.

C-ring type back-up ring systems, such as the ones included in one or more embodiments of the present disclosure, are beneficial in that they take less mechanical energy to set, and due to their increased thickness, are less prone to coining under fluid pressure. As such, the elastomer element used with such back-up ring systems has better initial sealing performance that may be maintained throughout its service life. As state above, C-rings have been initially '0' shaped, but have a deliberate rupture point that causes the ring to rupture. Rupture of the C-ring releases the strain energy that was previously stored. In its new C-ring form, the ring's radial expansion remains within the elastic zone and generates minimal hoop strains. As such, it takes very little mechanical energy for the C-ring to set, allowing more of the applied setting energy to be stored in the elastomer element. When the elastomer element sealing system sees differential pressure, the C-ring remains solid and does not further deform. As such, the initial pack-off of the elastomer element is maintained, which enhances the overall sealing performance of the elastomer element.

A drawback of using C-rings in conventional back-up ring systems is that, inherent to its geometry, the back-up ring cannot provide full anti-extrusion coverage around the elastomer element's circumference. The predefined rupture point, although initially small, will expand along its circumference as required for the C-ring to mate against the surrounding wellbore or casing, causing a large gap for extrusion to occur. To prevent total extrusion in such back-up ring systems, it is common to use two C-rings back to back, but rotationally offset. Therefore, when the elastomer element is set, the elastomer element can only extrude to the cross-sectional depth of the inner C-ring, before the elastomer element contacts the outer C-ring. The outer C-ring then provides extrusion coverage at that point. As such, while the elastomer element does extrude, it cannot extrude into the extrusion gap. As such, the elastomer element still retains sealing functionality.

However, the elastomer element's sealability is only as strong as its weakest point. Indeed, in conventional back-up ring designs, at least a portion of the elastomer element may be significantly less packed off due to localized extrusion. As such, this extruded region detrimentally drives the elastomer element's sealing performance in the application. The lower pack-off within the extruded region lessens the strain energy retention benefits that were initially realized from using the C-Ring over the FBR in the back-up ring design. Another issue is that the extruded region of the elastomer element is prone to fracturing. The fractured parts are no longer strain bearing and do not contribute towards sealing. Moreover, the crack contours may act as leak paths that circumvent effective sealing surfaces.

Given the above, the ideal elastomer element back-up system would include a C-ring style that minimizes the space available for the elastomer element to extrude into once expanded into the set position. The back-up ring system according to one or more embodiments of the present disclosure includes an additional metallic ring sheath in front of the inner C-ring to accomplish this aim. Further, a tool according to one or more embodiments of the present disclosure provides an improved support ring that provides better stability to the C-ring during its radial expansion. In one or more embodiments of the present disclosure, the support ring may include a PEEK ring installed therein, and a small foldback ring that does not contact the surrounding wellbore or casing may be incorporated into the tool to energize the PEEK ring during setting and loading.

Figure 3:
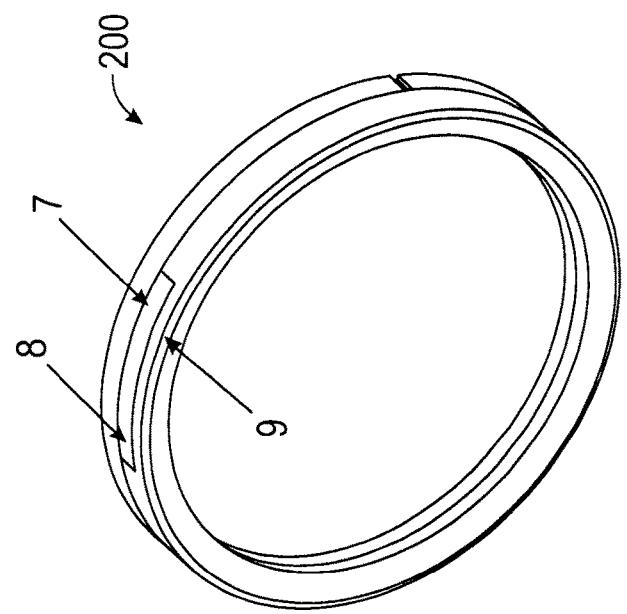
FIG. 3 shows a perspective view of a portion of the back-up ring system according to one or more embodiments of the present disclosure.
Figure 1:
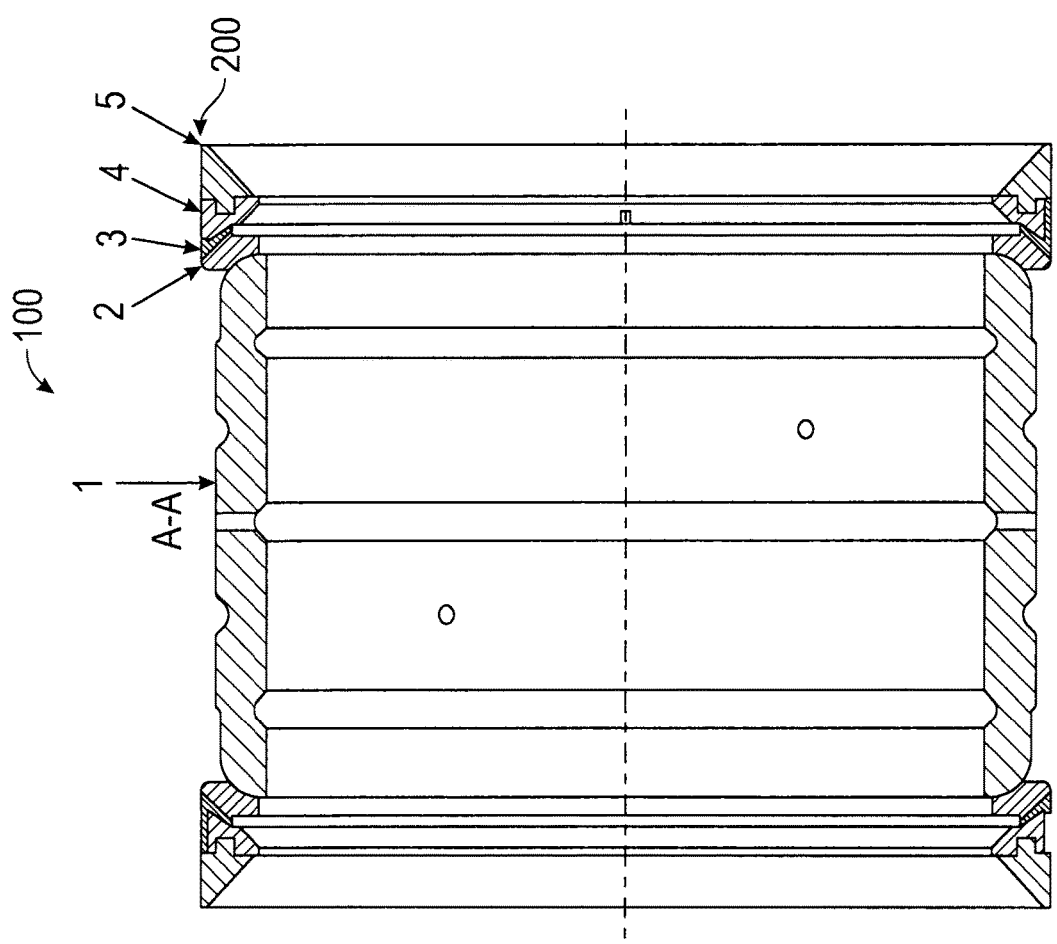
FIG. 1 is a cross-sectional view of a tool including an elastomer element, a support ring, and a back-up ring system according to one or more embodiments of the present disclosure.

Referring now to FIG. 1, a cross-sectional view of a tool 100 including an elastomer element 1, a support ring 2, and a back-up ring system 200 according to one or more embodiments of the present disclosure is shown. FIG. 2 shows a perspective view of the tool 100 shown in FIG. 1, including alignment spring pins 6, as further described below. FIG. 3, which is further described below, shows a perspective view of key features of the back-up ring system 200 according to one or more embodiments of the present disclosure.

Figure 4:
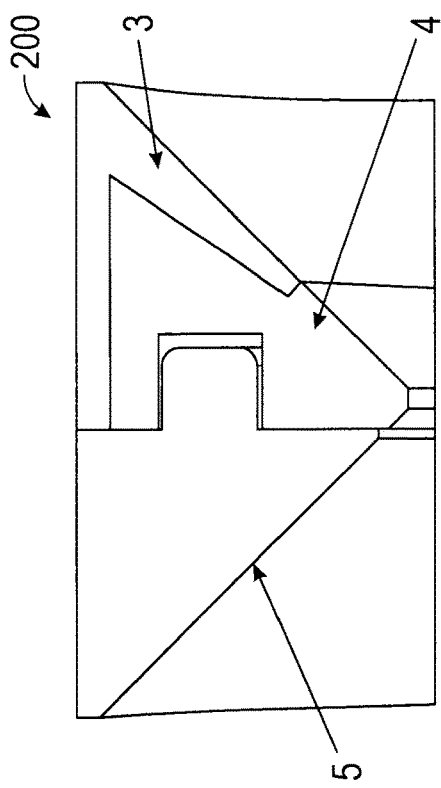
FIG. 4 shows a cross-sectional view of the back-up ring system according to one or more embodiments of the present disclosure.
Figure 14:
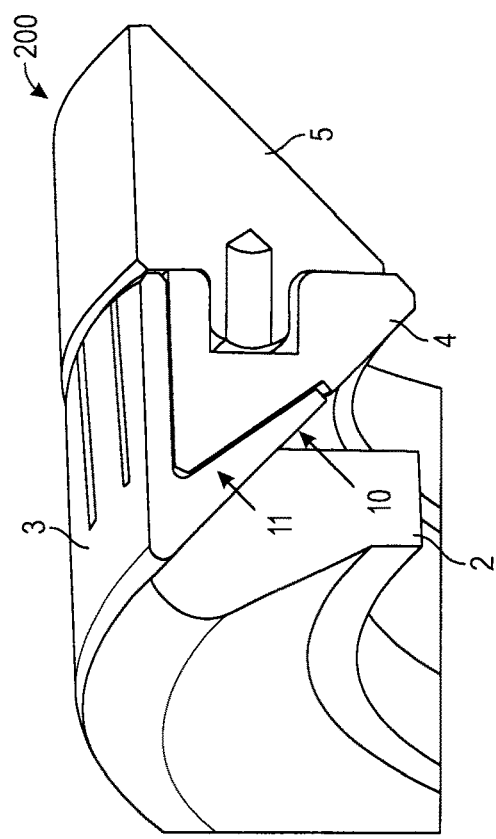
FIG. 14 shows key features of the back-up ring system according to one or more embodiments of the present disclosure.

Referring back to FIG. 1, the back-up ring system 200 includes a ring sheath 3, an inner C-ring 4, and an outer C-ring 5. As shown in FIG. 4, for example, the inner C-ring 4 mates with the outer C-ring 5, forming a 'V' shaped cross-section, and the ring sheath 3 fits onto the inner C-ring 4. According to one or more embodiments of the present disclosure, the ring sheath 3 may be metallic and may include a '7' shaped cross-sectional profile 10, as shown in FIG. 14, for example.

Advantageously, the '7' shaped cross-sectional profile of the ring sheath 3 has numerous benefits. First, as shown in FIG. 4, the '7' shaped cross-sectional profile of the ring sheath 3 may be machined to fit on top of the inner C-ring 4 in such a way that the 'V' shaped cross-section is maintained. As such, the inner C-ring 4 and the outer C-ring 5 of the back-up ring may maintain their setting process, and the '7' shaped cross-sectional profile of the ring sheath 3 according to one or more embodiments of the present disclosure may be used instead of conventional C-ring systems without modification to the tool.

Figure 5:
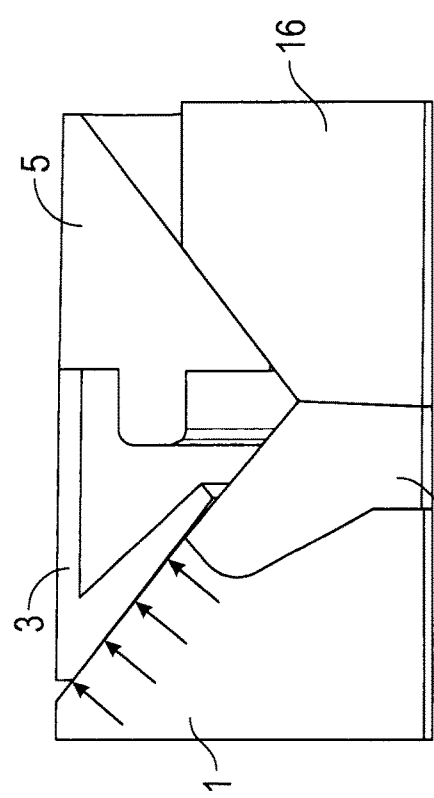
FIG. 5 shows how the tapered profile of the ring sheath resists loads going through the elastomer element according to one or more embodiments of the present disclosure.

Second, the '7' shaped cross-sectional profile of the ring sheath 3 has excellent buckling resistance under fluid pressure. Indeed, the top branch of the '7' profile generates a high second moment of area counter to the applied fluid pressure, which gives the ring sheath 3 resistance to buckling. Further, as shown FIG. 4, the lower branch of the '7' profile is deliberately tapered such that it is thicker at the profile's apex. The tapered lower branch 11 of the '7' ring sheath 3 is also shown in FIG. 14, for example. This tapering design provides additional support to the inner C-ring 4, resisting the tipping moment at the profile's apex, and strengthening the back-up ring system. As the back-up ring system 200 expands, the '7' ring sheath 3 covers the expansion point of the inner C-ring 4. In this region, the '7' ring sheath 3 is unsupported from behind and must have sufficient strength to resist large pressure loads. Given that the loading face of the '7' ring sheath 3 is angled, there is a large loading moment at the apex of the '7' profile. By tapering the lower branch of the '7' ring sheath 3, greater strength can be added at the apex of the '7' profile, providing greater resistance to the lower branch buckling inwards due to this moment, according to one or more embodiments of the present disclosure. For example, FIG. 5 shows how the tapered profile of the '7' ring sheath 3 resists loads going through the elastomer element 1 into the '7' ring sheath 3 in the unsupported region where the expansion gap of the inner C-ring 4 forms.

Figure 6:
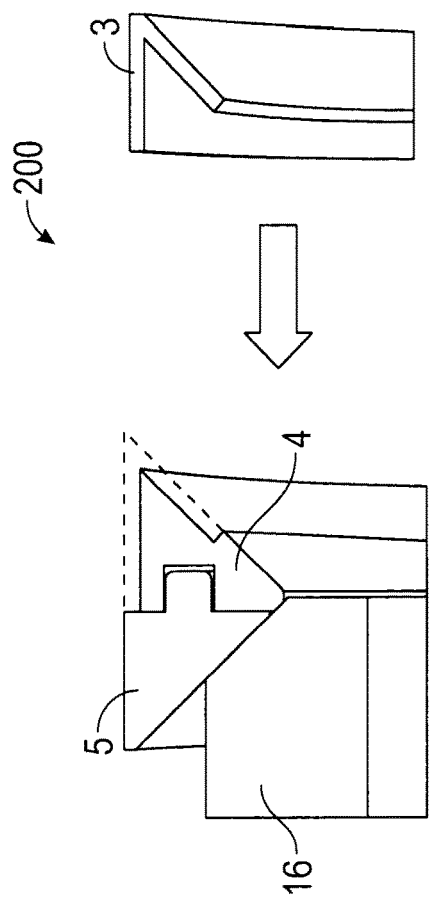
FIG. 6 shows installation of the ring sheath onto the inner C-ring of the back-up ring system according to one or more embodiments of the present disclosure.

Third, the '7' shaped cross-sectional profile of the ring sheath 3 allows the back-up ring system 200 to be assembled quickly and easily, as shown in FIG. 6, for example. During assembly, the inner C-ring 4 and the outer C-ring 5 are formed and mated together as normal. Thereafter, the '7' ring sheath 3 may be simply pushed onto the inner C-ring 4 to form the back-up ring system 200. This simplified process enables field crews to easily assemble the back-up ring system 200 according to one or more embodiments of the present disclosure with little room for human error.

Referring back to FIG. 3, a perspective view of a portion of the back-up ring system 200 according to one or more embodiments of the present disclosure is shown. Specifically, FIG. 3 shows a blocking segment 7 on the inner C-ring 4, a cut-out 8 on the '7' ring sheath 3 to match the blocking segment 7, and an off-set rupture point 9 on the '7' ring sheath 3. Like the inner and outer C-rings 4, 5, the '7' ring sheath 3 functions as a C-ring with a pre-defined rupture point 9 machined into the ring according to one or more embodiments of the present disclosure. However, because the '7' ring sheath 3 has a much smaller cross-sectional thickness than the inner and outer C-rings 4, 5, there is less free volume caused by the expansion of the '7' ring sheath 3. Therefore, less extrusion and unpacking of the elastomer element 1 is caused by the expansion of the '7' ring sheath 3.

Figure 7:
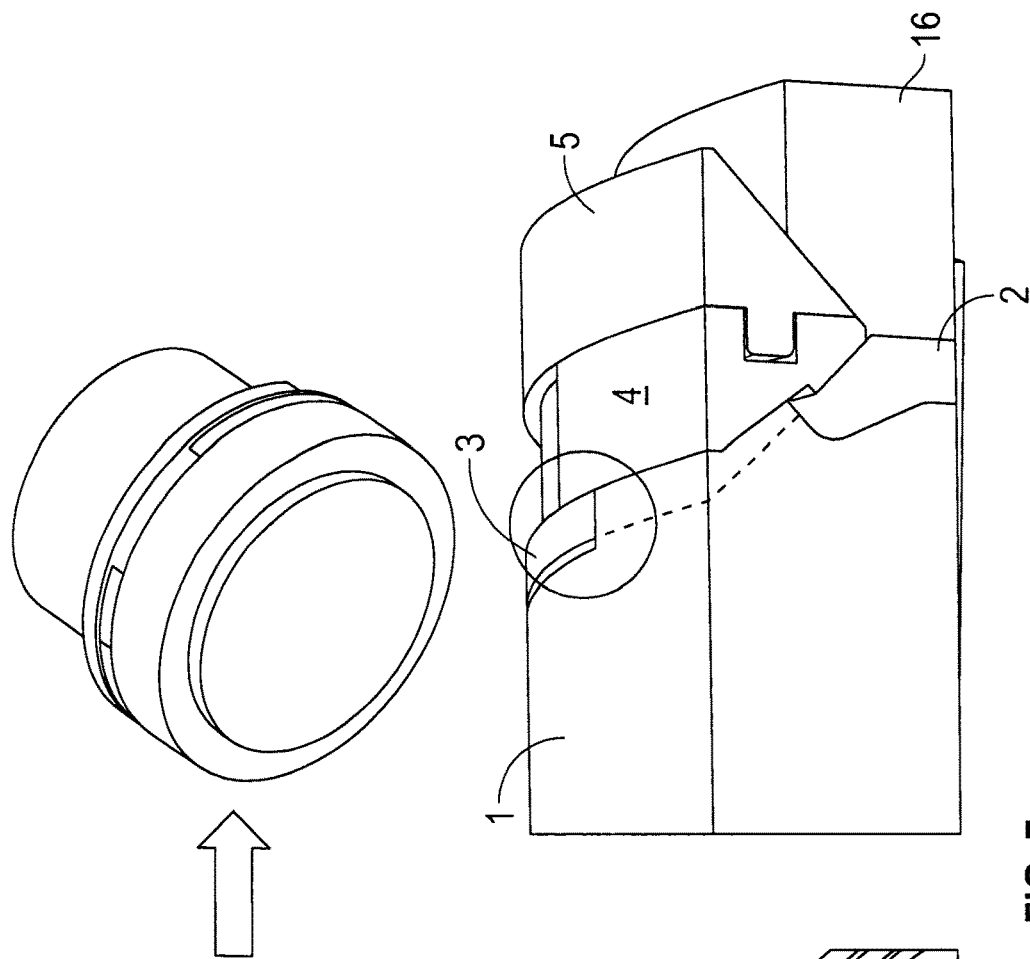
FIG. 7 shows use of a blocking segment on the inner C-ring of the back-up ring system according to one or more embodiments of the present disclosure.
Figure 7:
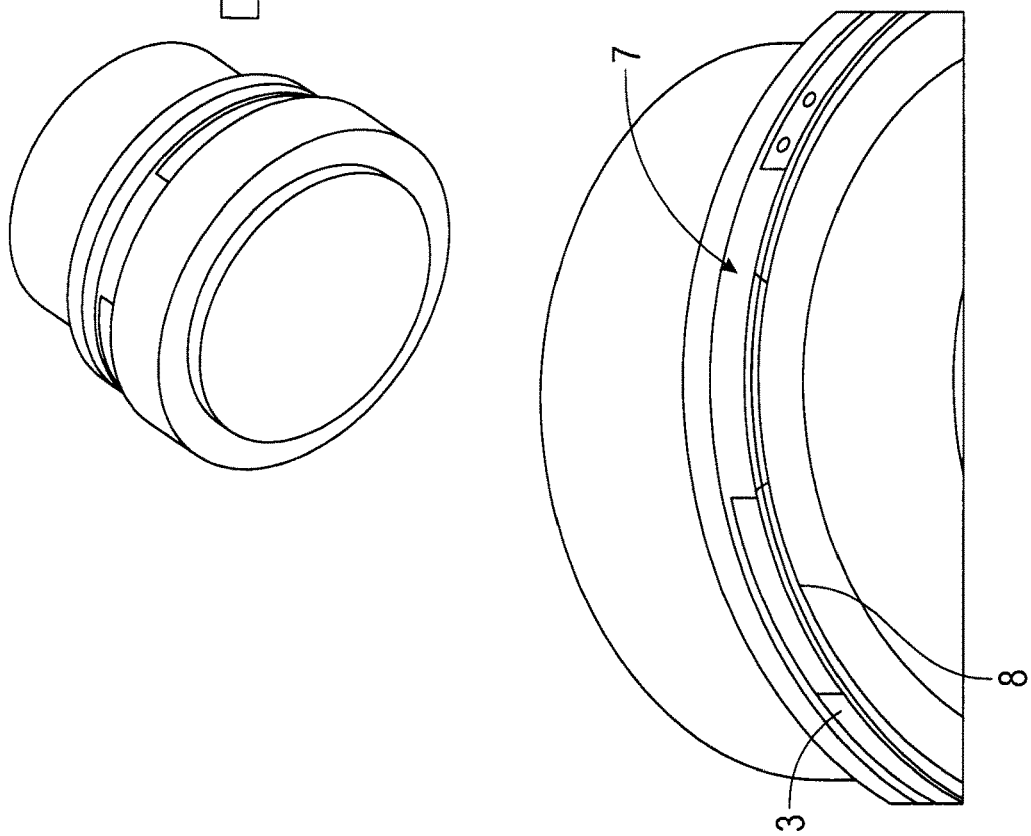
Figure 8A:
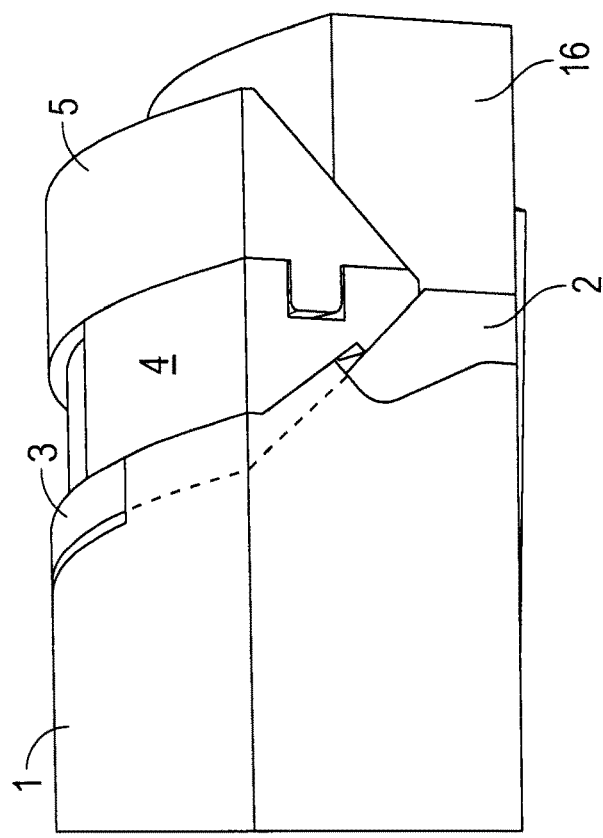
FIGS. 8A and 8B show the ring sheath of the back-up ring system resisting extrusion of the element according to one or more embodiments of the present disclosure.
Figure 8B:
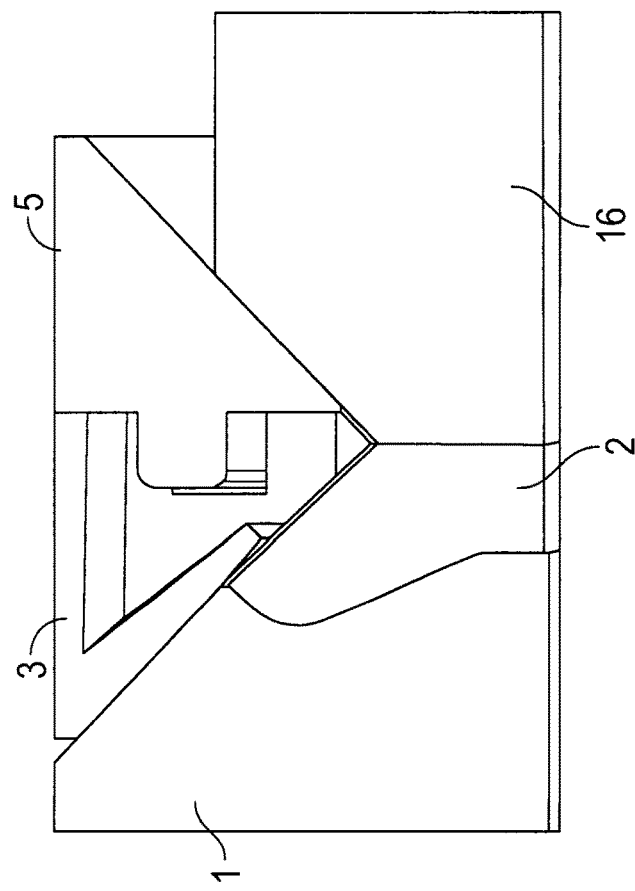

Referring now to FIG. 7, use of the blocking segment 7 on the inner C-ring 4 is shown, according to one or more embodiments of the present disclosure. Indeed, another key feature of the back-up ring system 200 according to one or more embodiments of the present disclosure that enables greater extrusion resistance is the blocking segment 7 on the inner C-ring 4 and the matching cut-out 8 on the top face '7' ring sheath 3. That is, the blocking segment 7 of the inner C-ring 4 ensures that, as the '7' ring sheath 3 ruptures and expands, the elastomer element 1 is prevented from pushing into the cut-out made on the inner C-ring 4 to house the top branch of the '7' shaped cross-sectional profile of the ring sheath 3. For example, FIGS. 8A and 8B show the '7' ring sheath 3 resisting extrusion of element 1 when in the set position. Specifically, FIG. 8A shows the '7' ring sheath 3 blocking the expansion gap of the inner C-ring 4, and FIG. 8B shows, along with FIG. 7, the limited extrusion region allowed by the expansion of the '7' ring sheath 3, with the blocking segment 7, ensuring no extrusion in the upper region. Indeed, this is a critical feature of the back-up ring system 200 according to one or more embodiments of the present disclosure. By preventing the elastomer element 1 from extruding into the extrusion gap of the back-up ring system 200, which is a long, thin region, damage to the elastomer element 1, and hence, a loss of sealing performance may be avoided.

Moreover, the blocking segment 7 naturally aligns the rotational positioning of the '7' ring sheath 3 with that of the inner C-ring 4 according to one or more embodiments of the present disclosure. If the '7' ring sheath 3 was free to rotate, there is a chance that its rupture point could align with the rupture point of the inner C-ring 4. In this scenario, the '7' ring sheath 3 provides no functional extrusion resistance, and the elastomer element 1 would extrude into the gap created by both C-rings 4, 5, rupturing and expanding. That is, in this scenario, the system would essentially act as per conventional C-Ring designs, contrary to one or more embodiments of the present disclosure. However, through the blocking segment 7, the rupture points of the inner C-ring 4 and the '7' ring sheath 3 can be angularly offset ensuring that such extrusion of the elastomer element 1 into the gap created by the rupture and expansion of the rings cannot occur. Advantageously, angularly offsetting the rupture points of the inner C-ring 4 and the '7' ring sheath 3 through the blocking segment 7, ensures that the free space created by the expansion of the inner C-ring 4 is always blocked by the '7' ring sheath 3, as shown in FIG. 8A, for example.

Figure 9B:
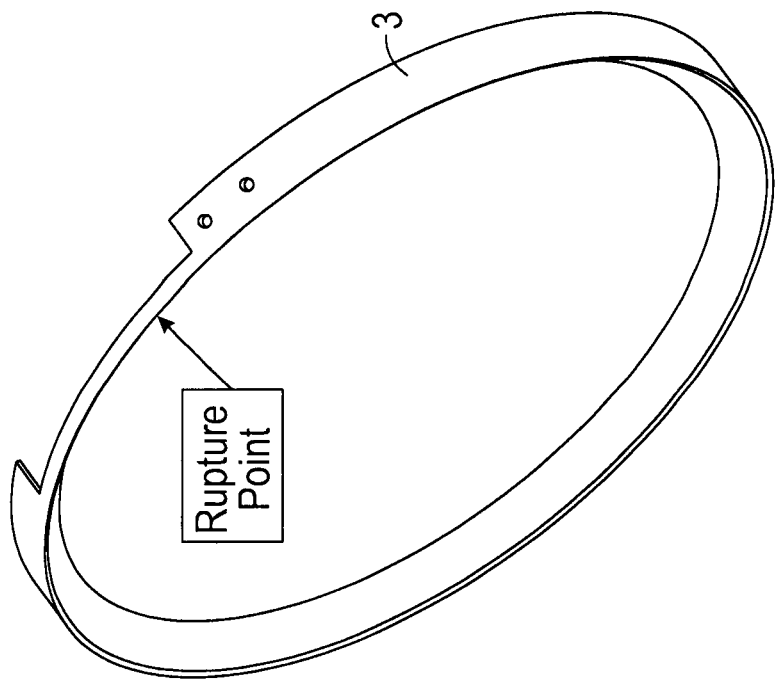
FIGS. 9A and 9B show a geometry of the ring sheath of the back-up ring system according to one or more embodiments of the present disclosure.
Figure 9A:
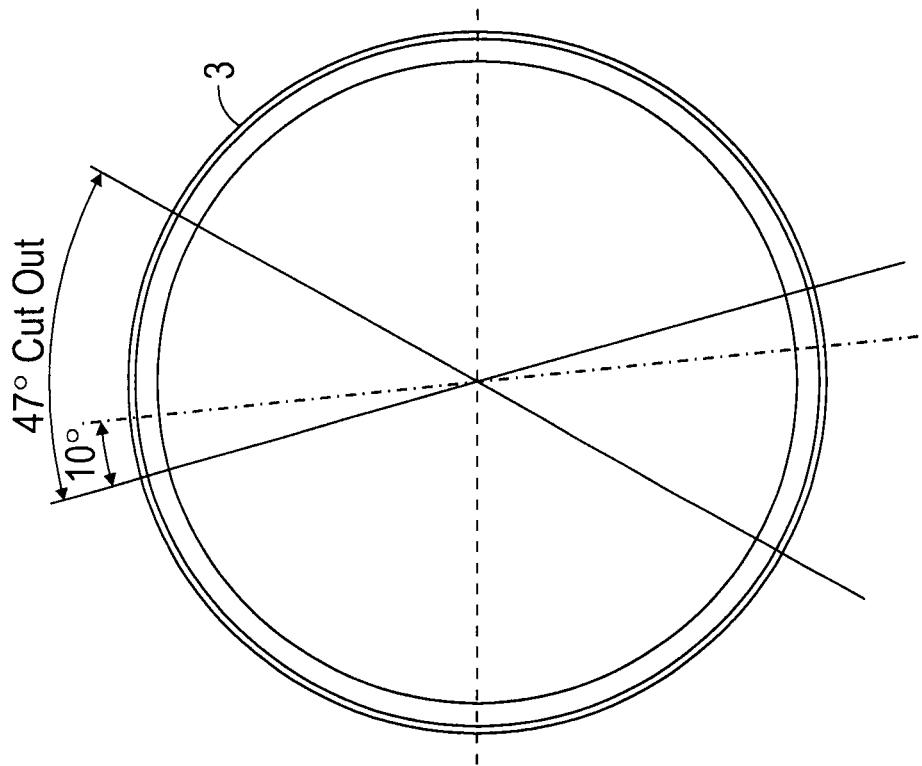

Referring now to FIGS. 9A and 9B, the geometry of the '7' ring sheath 3 of the back-up ring system 200 according to one or more embodiments of the present disclosure is shown. For example, FIG. 9B shows that the '7' ring sheath 3 includes a rupture point, a cut-out for the blocking segment 7, and alignment pin holes for alignment spring pins 6, as previously described. For certain casing or wellbore sizes, in one or more embodiments of the present disclosure, the blocking segment 7 spans a 45° section of the inner C-ring 4, with the cut-out on the '7' ring sheath spanning 47°, as shown in FIGS. 9A and 9B, for example. The minimal degree difference allows for potential tolerance variations, enabling the parts of the back-up ring system 200 to mate successfully. It should be noted, however, that the span of the cut-out on the '7' ring sheath 3 can be varied according to the expansion needed by the inner C-ring 4 without departing from the scope of the present disclosure. As such, the '7' ring sheath 3 of the back-up ring system 200 is not limited to the particular angle size as described in one or more embodiments of the present disclosure. An important design consideration here is that the rupture point of the '7' ring sheath 3 is not centered with respect to the cut-out for the blocking segment 7, but rather, is biased toward the side away from the rupture point of the inner C-ring 4, as shown in FIG. 9B, according to one or more embodiments of the present disclosure. This is because the expansion of the '7' ring sheath 3 tends to bias towards the side of the rupture point of the inner C-ring 4. As such, this offset allows the blocking segment 7 of the inner C-ring 4 to maintain full coverage of the extrusion gap of the '7' ring sheath 3 in one or more embodiments of the present disclosure.

As previously described with respect to FIG. 2, the back-up ring system 200 according to one or more embodiments of the present disclosure may include at least one alignment spring pin 6 that connects the '7' ring sheath 3 to the inner C-ring 4. For example, as shown in FIG. 9B, the '7' ring sheath 3 may include two alignment pin holes for accommodating two alignment spring pins 6 in one or more embodiments of the present disclosure. Advantageously, the alignment pins 6 provide multiple functionalities. First, the alignment pins 6 prevent any axial or angular movement between the '7' ring sheath 3 and the inner C-ring 4. The blocking segment 7 on the inner C-ring 4 is only capable of preventing angular movement—it cannot prevent axial movement. Preventing axial movement of the '7' ring sheath 3 and the inner C-ring 4 is important to ensure proper alignment even under swab-off conditions. Any additional rotational resistance provided by the alignment pins 6 is a plus.

Figure 10A:
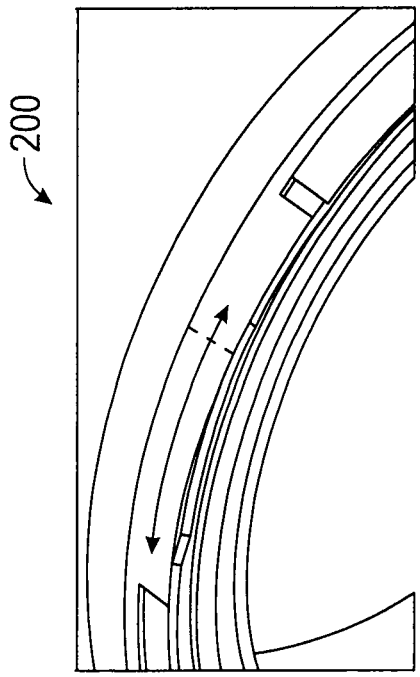
FIGS. 10A and 10B show a pre- and post-set back-up ring system with and without alignment pins according to one or more embodiments of the present disclosure.
Figure 10A:
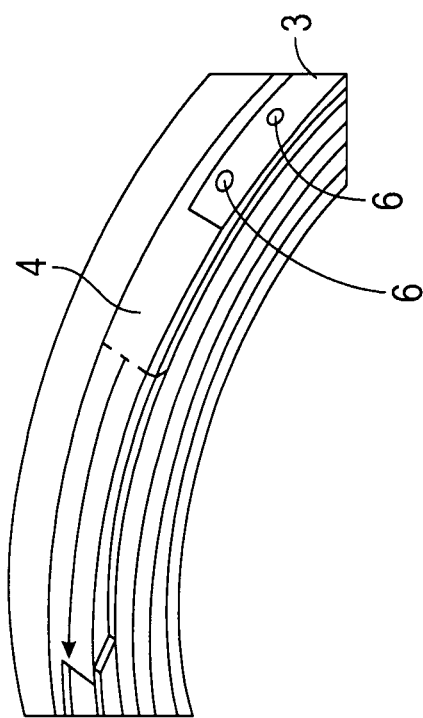
Figure 10B:
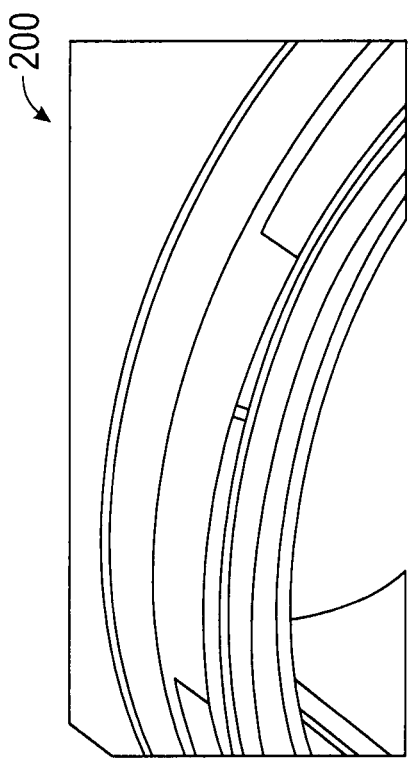
Figure 10B:
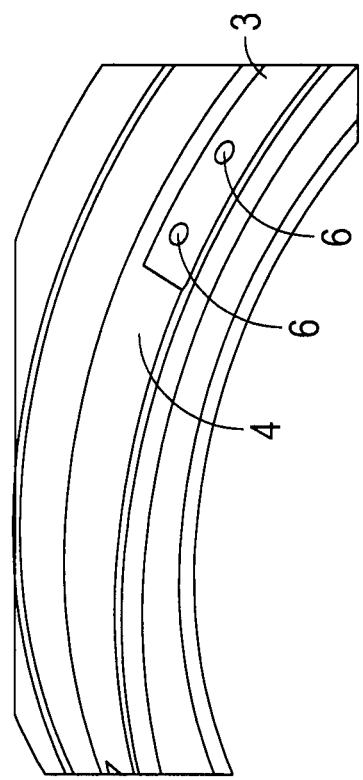

Second, as the C-rings rupture and expand, the alignment pins 6 lock the relative movement of the inner C-ring 4 to the '7' ring sheath 3 as both expand, but only at that single point. As such, both rings are free to expand and open, but axial movement is still prevented, and angular rotation of the '7' ring sheath 3 is prevented. Post expansion, the cut-out of the '7' ring sheath 3 will be expanded beyond the span of the blocking segment 7 allowing gaps to open up. If the alignment pins 6 were not included, such that the '7' ring sheath 3 and inner C-ring 4 were able to freely rotate against each other, the gaps allowed by this free rotation could allow free space to open up around the blocking segment 7, which would allow some amount of extrusion of the elastomer element 1. Because the alignment pins 6 stop these gaps from forming, the alignment pins 6 help ensure full extrusion resistance during and post setting of the elastomer element 1. For example, FIGS. 10A and 10B show a pre- and post-set back up ring system 200 with and without alignment pins 6 according to one or more embodiments of the present disclosure.

Figures 11A, 11B:
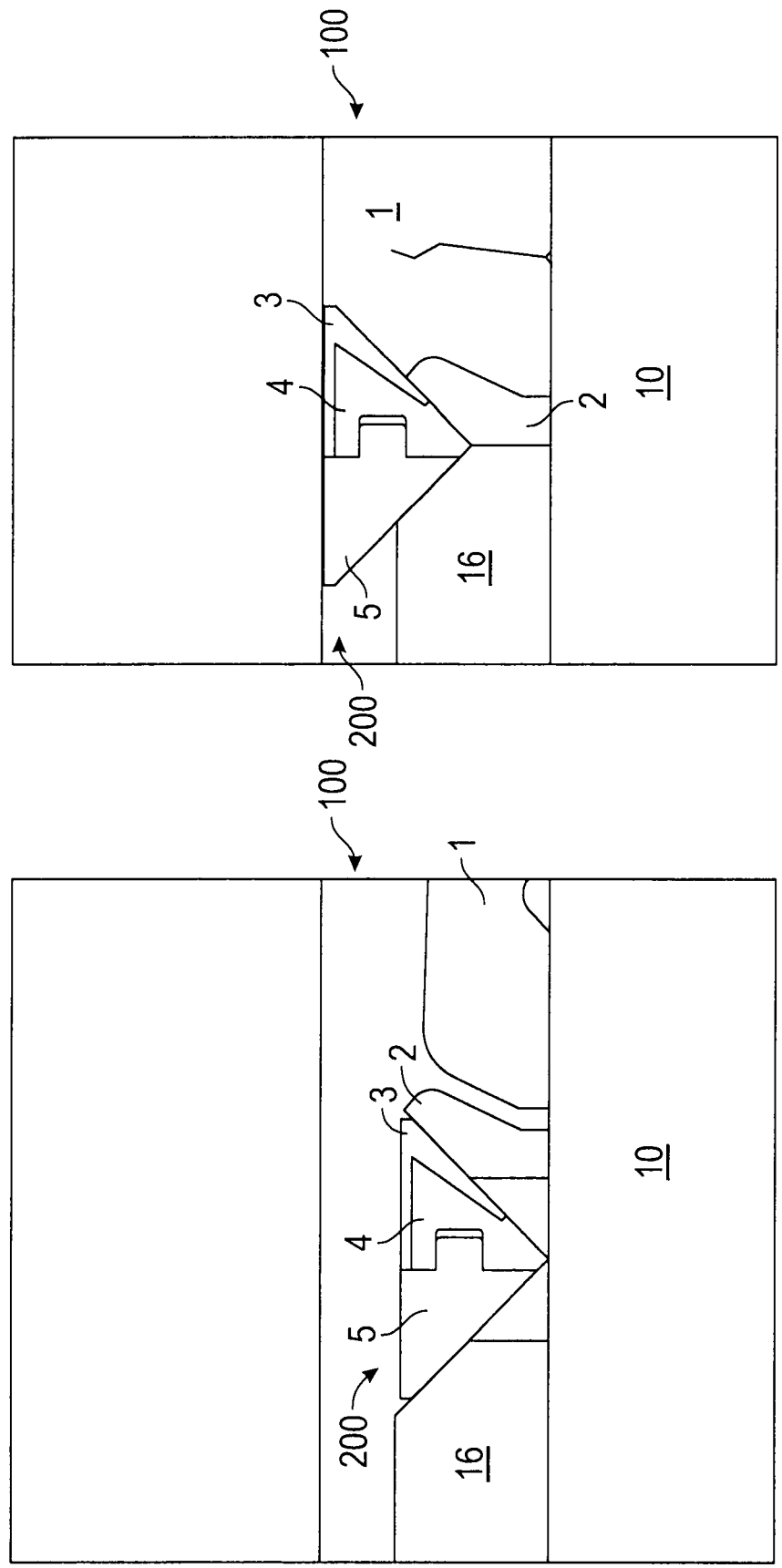
FIGS. 11A and 11B show a pre- and post-set tool including a mandrel, an elastomer element, a support ring, a back-up system, and a gauge ring according to one or more embodiments of the present disclosure.

As previously described with respect to FIG. 1, the tool 100 according to one or more embodiments of the present disclosure includes a support ring 2. FIGS. 11A and 11B show a pre- and post-set tool including a mandrel 10, an elastomer element 1, a support ring 2, a back-up ring system 200, including a '7' ring sheath 3, an inner C-ring 4, and an outer C-ring 5, and a gauge ring 16 according to one or more embodiments of the present disclosure. According to one or more embodiments of the present disclosure, the support ring 2 is used to provide a ridge face on the elastomer element's 1 side of the tool 100 against which the inner C-ring 4 can push against and slide up during setting.

Figure 12A:
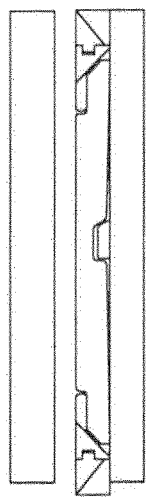
FIGS. 12A and 12B show a conventional support ring system with a common C-ring design and the resulting strain field of the elastomer element post-set.
Figure 12B:
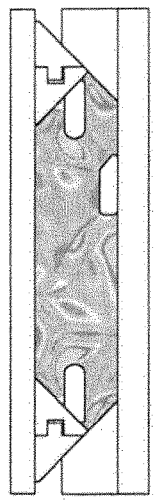

Referring now to FIGS. 12A and 12B, a conventional support ring system with a common C-ring design and the resulting strain field of the elastomer element post-set are shown. Typically, support rings that support back-up ring systems tend to be long and thin rings. This conventional style of support ring has two major drawbacks. First, typical support rings provide limited contact to the C-ring, and hence, provide limited support to help stabilize the C-ring's expansion. The main support for the C-ring comes from the gauge ring 16 driving under the C-ring. Therefore, the C-Ring is only really fully supported on the outer side, and not on the inner side, as shown in FIG. 12A, for example.

Second, as the elastomer element is set, the element buckles and bulges around the conventional support rings. Because the support rings are quite long compared to their thickness, there is a substantial amount of free space above and below the support rings that the elastomer element can flow into, as shown in FIG. 12B, for example. As such, conventional support rings drive into the elastomer element generating regions of high strains and ultimately hot spots for fracture, especially around the area of the support rings. Indeed, it is extremely common for the elastomer element to fracture at and around the conventional support rings. Any fracture point is a weak point for sealing as it releases energy stored within the elastomer element.

The support rings 2 according to one or more embodiments of the present disclosure were designed to address the limitations of conventional support rings. For example, referring back to FIGS. 11A and 11B, the support ring 2 of the tool 100 according to one or more embodiments of the present disclosure is shown. The support ring 2 according to one or more embodiments of the present disclosure was specifically designed to improve the stability of the C-ring's expansion by providing balanced support on the inner and outer faces of the back-up ring system 200. As shown in FIG. 11A, for example, the support ring 2 according to one or more embodiments of the present disclosure does not sit above the elastomer element 1, as per conventional designs. Instead, the support ring 2 according to one or more embodiments of the present disclosure sits between the elastomer element 1 and the inner C-ring 4 side of the back-up ring system 200. Moreover, as better shown in in FIG. 11B, the support ring 2 includes a cross-sectional height that matches that of the gauge ring 16 of the tool 100. That is, the support ring 2 according to one or more embodiments of the present disclosure is thicker and shorter than conventional support rings, as previously described. Moreover, as shown in FIGS. 11A and 11B, the gauge ring 16 of the tool 100 according to one or more embodiments of the present disclosure has a single chamfered corner (instead of the triangular face of conventional gauge rings, FIG. 12A), with the chamfer extending below the lowest face of a tang of the outer C-ring 5 when in the set position. The support ring 2 according to one or more embodiments of the present disclosure provides a matching angular surface to that of the gauge ring 16. As such, the support ring 2 and the gauge ring 16 according to one or more embodiments of the present disclosure have similar contact patches with the back-up ring system 200.

Referring specifically to FIG. 11B, during setting, the gauge ring 16 drives into elastomer element 1 with the element's 1 resultant force pushing the support ring 2 under the inner C-ring 4 helping it to rise up. The even contact patches on the inner and outer faces of the back-up ring system 200 minimize the risk that the C-Rings twist or tip during and after setting, which is a common issue with conventional designs. Once set, the back-up ring system 200 according to one or more embodiments of the present disclosure is cupped evenly between the support ring 2 and the gauge ring 16, as shown in FIG. 11B, for example. In one or more embodiments of the present disclosure, the support ring 2 is also butted securely against the gauge ring 16 in the set position, as shown in FIG. 11B, for example. As such, the support ring 2, as a component of the back-up ring system 200 according to one or more embodiments of the present disclosure, helps provide excellent support on both the inner and the outer faces of the back-up ring system 200, thereby improving stability during setting.

Figure 13B:
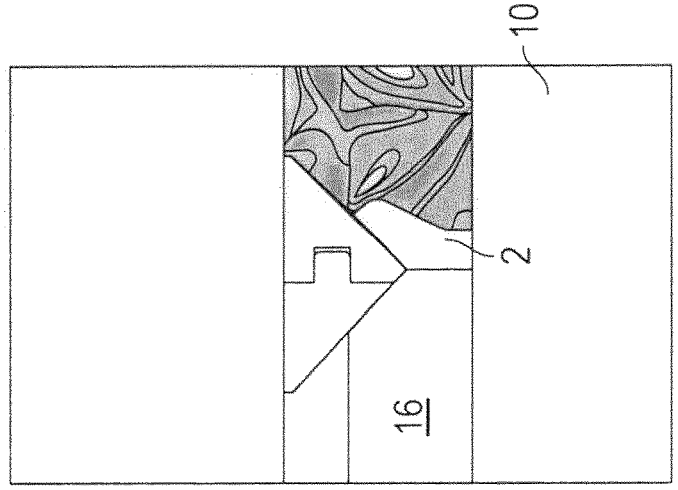
FIGS. 13A and 13B show the transition between the support ring and the back-up ring system according to one or more embodiments of the present disclosure and the resulting strain field of the elastomer element post-set.
Figure 13A:
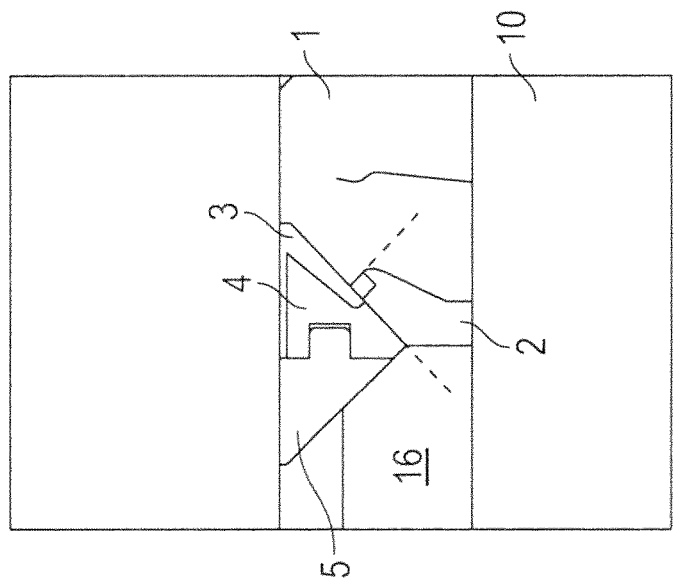

Additionally, contrary to the conventional designs described with respect to FIGS. 12A and 12B, the support ring 2 according to one or more embodiments of the present disclosure was designed to not become a localized hot-spot for fracture. As previously described, conventional support rings commonly lead to fracture because such support rings include a long surface area over which the elastomer element must extrude during pack-off. That is, there is essentially too much free space beyond the support rings in conventional designs. In the tool 100 according to one or more embodiments of the present disclosure, however, there was barely any extrusion gap, and the transition angles between the support ring 2 and the inner C-ring 4 were purposefully designed to help the elastomer element 1 to fill in any gaps without forming strain concentrations, as shown in FIGS. 13A and 13B, for example. The inner face of the support ring 2 according to one or more embodiments of the present disclosure is tapered to match the angling of the end faces of the elastomer element 1, which helps these components mate smoothly. As shown in FIG. 13A, for example, the outer apex of the support ring 2 was angled such that it lay perpendicular to the '7' ring sheath 3 once set. This configuration provides an easier transition for the elastomer element 1 to deform into when packed off, which prevents the formation of stress concentrations, as shown in FIG. 13B, for example. As such, the support ring 2 according to one or more embodiments of the present disclosure provides a more stable setting approach with a lower fracture risk than conventional support rings.

Further, it should be noted that the tool 100, including the back-up ring system 200 and the support ring 2, is not limited to one elastomer element style. For example, while FIG. 1 depicts an M-style elastomer element 1, the tool 100 according to one or more embodiments of the present disclosure may be suitable for use with a range of elastomer element 1 geometries, including X-style and A-style, for example.

Referring now to FIG. 14, key features of the back-up ring system 200 according to one or more embodiments of the present disclosure are shown. Specifically, FIG. 14 shows, the support ring 2, the '7' ring sheath 3, the inner C-ring 4, the outer C-ring, the '7' shaped cross-sectional profile 10 of the '7' ring sheath 3, and the tapered lowered branch 11 of the '7' ring sheath 3, as previously described.

Figure 15:
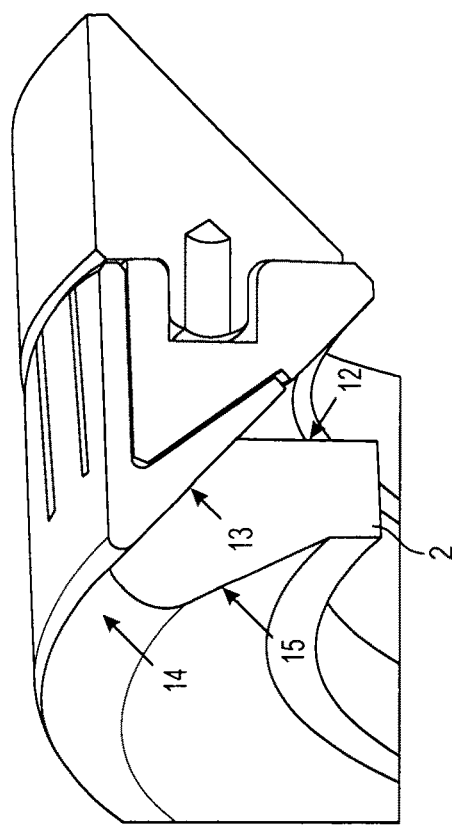
FIG. 15 shows key features of the support ring according to one or more embodiments of the present disclosure.

Referring now to FIG. 15, key features of the support ring 20 according to one or more embodiments of the present disclosure are shown. Specifically, FIG. 15 shows the mating face 12 of the support ring 2 for face-to-face contact with the gauge ring 16, as previously described. Further, FIG. 15 shows that the support ring 2 includes a parallel contact region 13 that evenly contacts the 'V' shaped profile of the outer C-ring 5 and the inner C-ring 4 to stabilize setting of the tool 100. As shown in FIG. 15, the support ring 2 according to one or more embodiments of the present disclosure may also include a top face 14 that is perpendicular to the 'V' shaped profile of the outer C-ring 5 and the inner C-ring 4 to limit extrusion and stress concentrations, as previously described. FIG. 15 also shows that the support ring 2 according to one or more embodiments of the present disclosure may also include an inner face 15 tapered to match an end of the elastomer element 1 to provide swab-off resistance and smooth axial transfer of load, as previously described.

Figure 16:
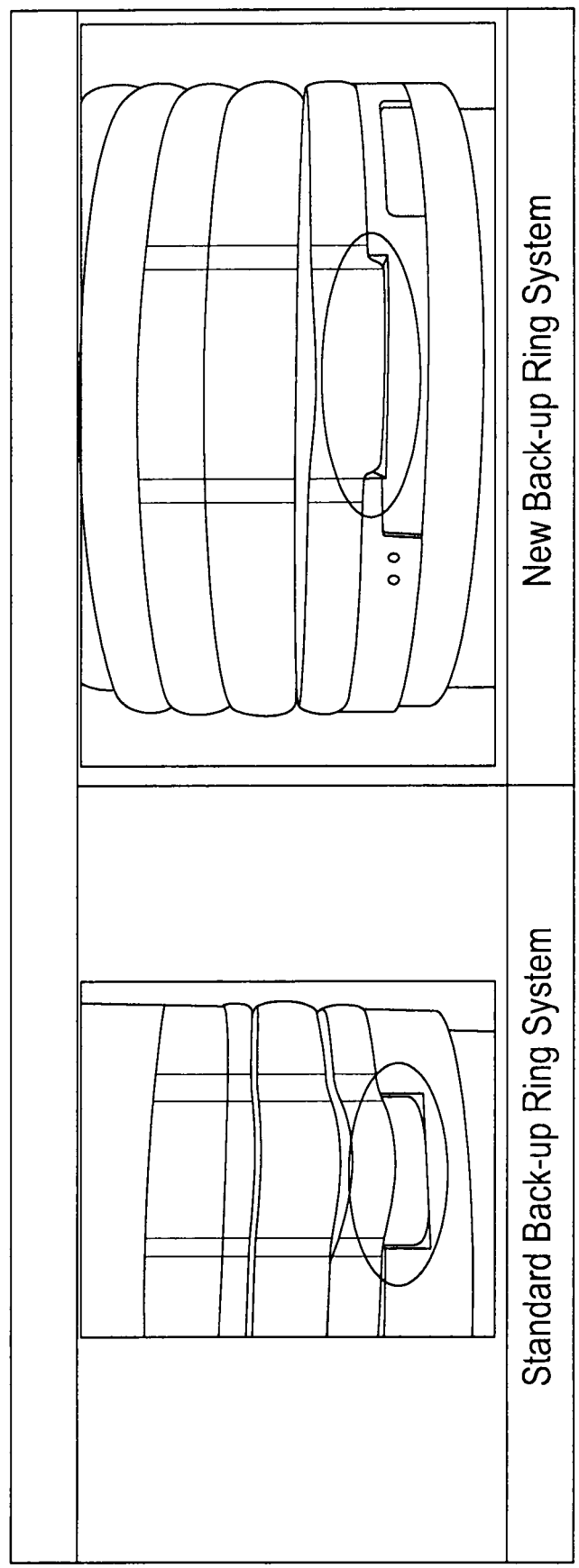
FIG. 16 shows a comparison between a standard back-up ring system and the back-up ring system according to or more embodiments of the present disclosure.
Figure 17:
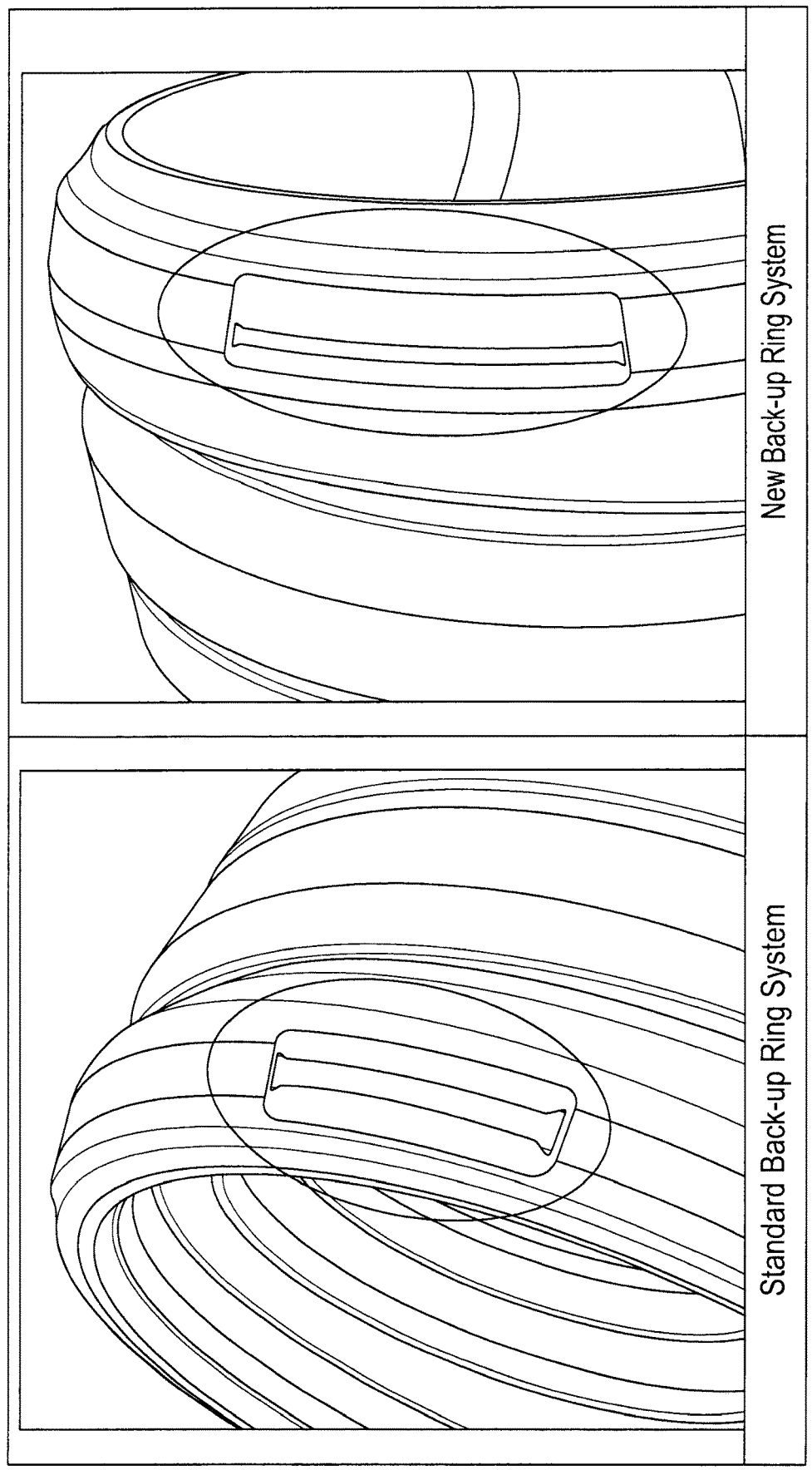
FIG. 17 shows a comparison of elastomer element damage between a standard back-up ring system and the back-ring system according to one or more embodiments of the present disclosure.

Referring now to FIG. 16, a comparison between a standard back-up ring system and the back-up ring system 200 according to one or more embodiments of the present disclosure is shown. Specifically, the back-up ring system 200 according to one or more embodiments of the present disclosure has been tested on a packing element, and has shown clear results and advantages over conventional C-ring (or V-ring) systems. As shown in FIG. 16, post-test elastomer element configurations are provided using a conventional C-ring system and the back-up ring system 200 according to one or more embodiments of the present disclosure. Notably, the same M-style elastomer element was tested in both systems. As clearly shown, there is far less free space within the back-up ring system 200 according to one or more embodiments of the present disclosure for the elastomer element 1 to flow into. That is, it is estimated that only about 10% of the extruded volume in the conventional C-ring system was extruded in the back-up ring system 200 according to one or more embodiments of the present disclosure. Ultimately, the back-up ring system 200 according to one or more embodiments of the present disclosure allows the elastomer element 1 to be more uniformly set. In contrast, in the conventional C-ring system, there is a clear flow path on the elastomer element's center buckle at the expansion point, where the element had to compensate for the end buckle flowing into the extrusion gap. Due to the lower levels of extrusion, there is no such flow point with the back-up ring system 200 according to one or more embodiments of the present disclosure. As such, when the back-up ring system 200 according to one or more embodiments of the present disclosure is used, the elastomer element 1 better maintains its sealing performance. Moreover, as shown in in FIG. 17, the back-up ring system 200 according to one or more embodiments of the present disclosure significantly reduces the amount of damage to the element 1 caused by the element extruding. As shown in FIG. 17, there is a protuberance on the element caused by its extrusion into the available gap in the respective back-up ring systems. As further shown in FIG. 17, the protuberance is much larger when using the conventional C-ring (or V-ring) system. In the conventional C-ring system, the extrusion has also caused the formation of strains, as shown by the cracks down the length of this region of the elastomer around the edges of the nub. Advantageously, no such fracture is seen with the back-up ring system 200 according to one or more embodiments of the present disclosure, as much lower levels of extrusion occur.

Figure 18:
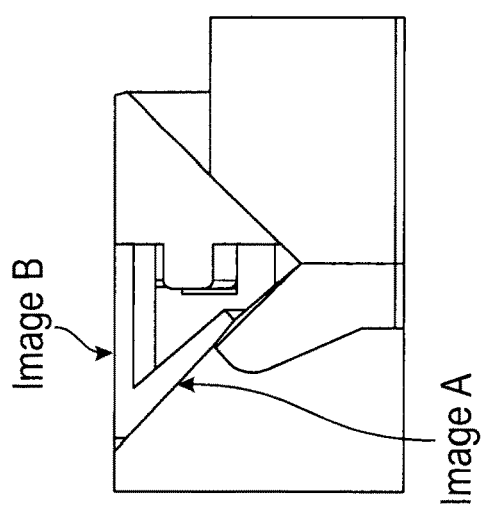
FIG. 18 shows the strength of the ring sheath of the back-up ring system according to one or more embodiments of the present disclosure.
Figure 18:
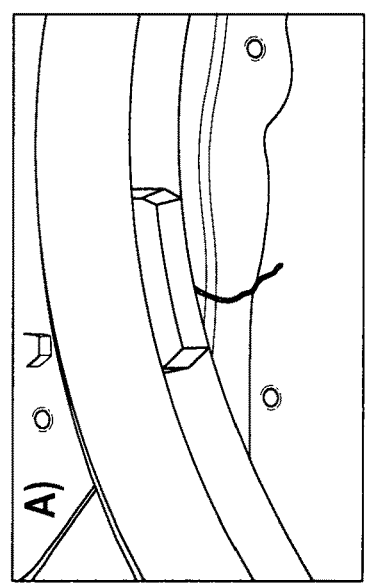
Figure 18:
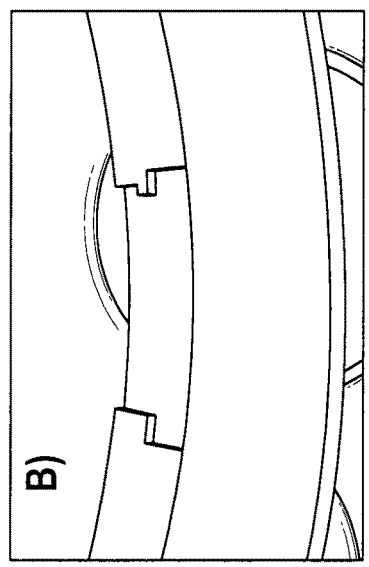

Referring now to FIG. 18, the strength of the '7' ring sheath 3 of the back-up ring system 200 according to one or more embodiments of the present disclosure is shown. Indeed, post-testing, the '7' profile was shown to have functioned extremely well. Specifically, FIG. 18 shows the '7' ring sheath 3 in the region of the expansion gap of the inner C-ring 4. As shown in the images of FIG. 18, there is no buckling/tipping of the '7' ring sheath 3 in this region, and the '7' ring sheath 3 appears to be un-deformed. This confirms that the '7' profile of the ring sheath 3, according to one or more embodiments of the present disclosure, provides sufficient strength to resist the buckling loads in the region.

Moreover, the back-up ring system 200 according to one or more embodiments of the present disclosure exhibits superior sealing performance, even at lower temperatures. For example, the improved extrusion resistance of the back-up ring system 200 according to one or more embodiments of the present disclosure is highly beneficial for the element's low temperature sealability. Indeed, when tested with a conventional back-up ring system, the elastomer element's minimum temperature for a 7 ksi hold was 46°. However, the back-up ring system 200 according to one or more embodiments of the present disclosure was able to achieve this hold at 39° F.

Figure 19:
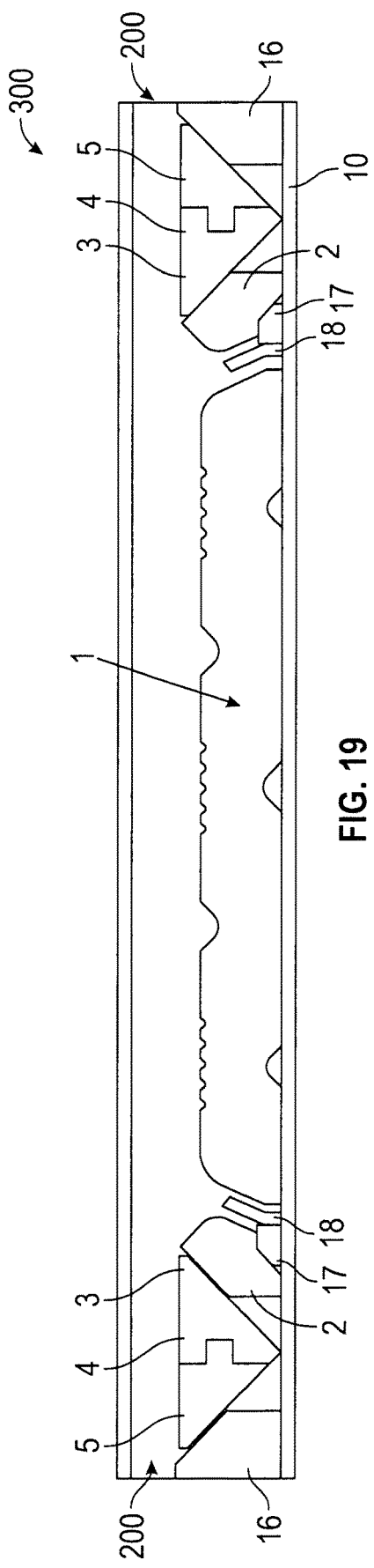
FIG. 19 shows a tool in an unset position including PEEK rings installed in the support rings and foldback rings for energizing the PEEK rings according to one or more embodiments of the present disclosure.
Figure 20:
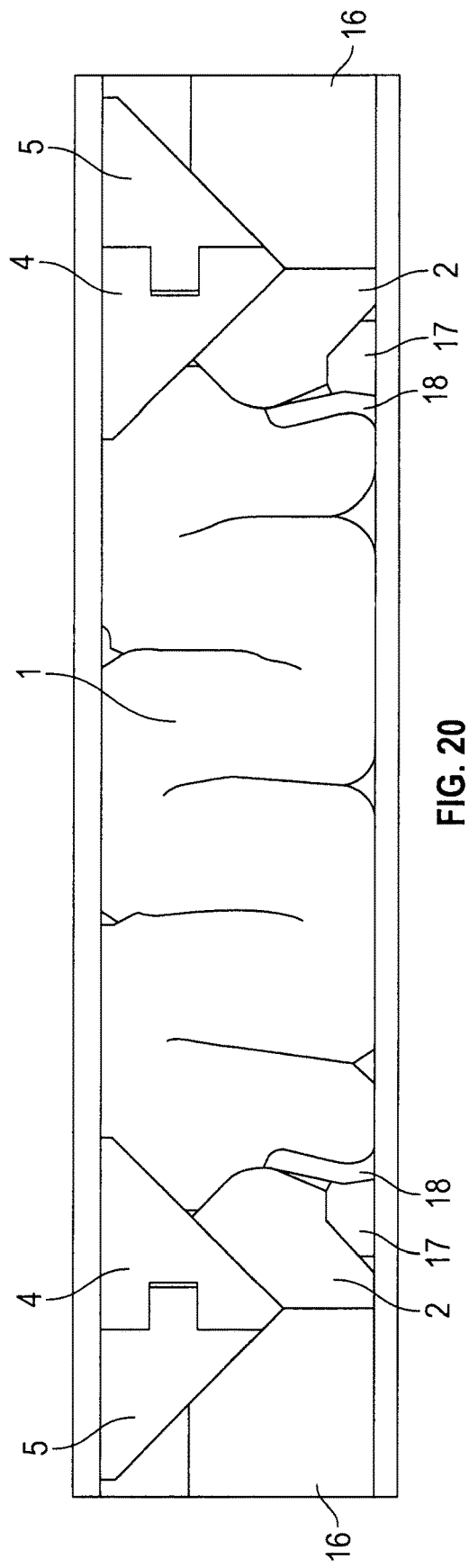
FIG. 20 shows the tool of FIG. 19 in a set position.

Referring now to FIGS. 19 and 20, a tool 300 according to one or more embodiments of the present disclosure is shown in unset and set positions, respectively. Similar to the tool 100 as previously described, the tool 300 includes an elastomer element 1, support rings 2, back-up ring systems 200 as previously described, and gauge rings 16 disposed on a mandrel 10. However, the tool 300 according to one or more embodiments of the present disclosure may also include PEEK rings 17 installed in the support rings 2. By installing the PEEK rings 17 in the support rings 2, the PEEK rings 17 allow the support rings 2 to contact the elastomer element 1 in all set conditions. As further shown in FIGS. 19 and 20, the tool 300 according to one or more embodiments of the present disclosure may include foldback rings 18. In contrast to the FBRs used in conventional back-up ring systems, which attempt to prevent outer diameter extrusion as previously described, the foldback rings 18 of the tool 300 according to one or more embodiments of the present disclosure do not contact the surrounding casing or wellbore. Indeed, the sole purpose of the foldback rings 18 of the tool according to one or more embodiments of the present disclosure is to deform to contact and energize the PEEK rings 17 during setting and loading.

Figure 21:
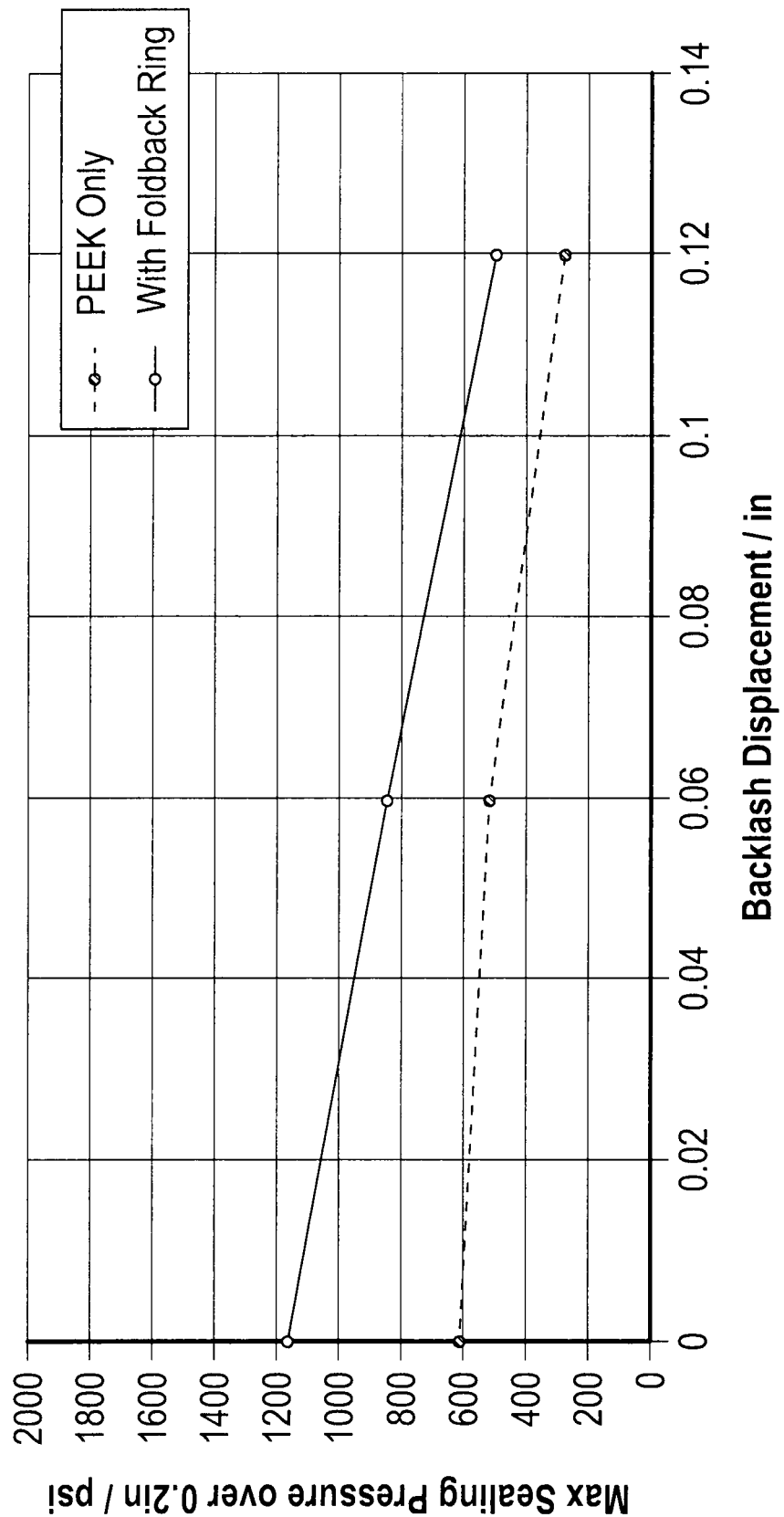
FIGS. 21 and 22 show improvements in PEEK ring contact pressure with the addition of foldback rings to the tool according to one or more embodiments of the present disclosure.
Figure 22:
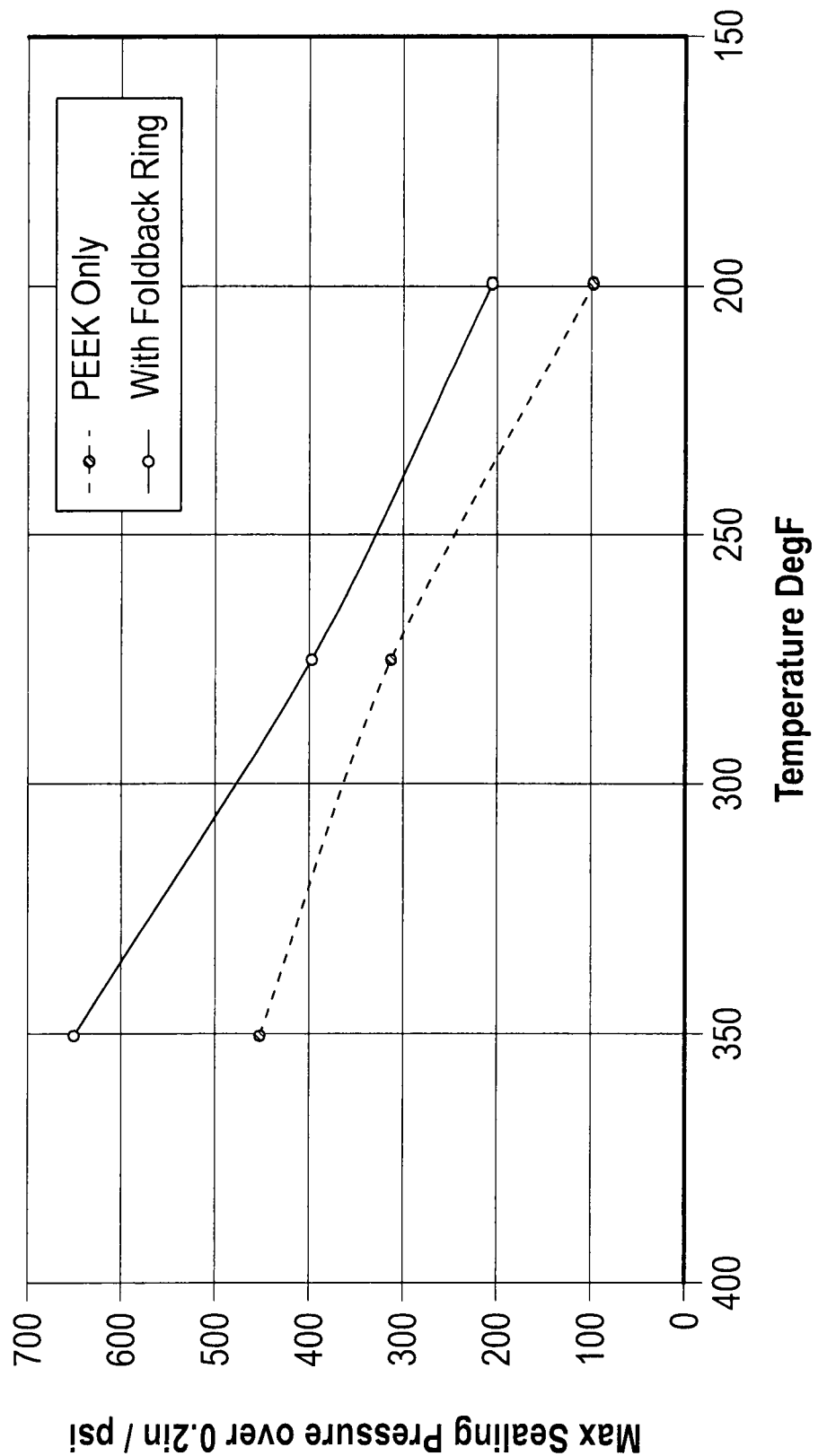

Advantageously, as shown in FIGS. 21 and 22, improvements in PEEK ring contact pressure may be seen with the addition of the foldback rings 18 to the tool 300 according to one or more embodiments of the present disclosure, even with ratchet backlash or cooling of the elastomer element 1. For example, FIG. 21 shows the effect of backlash on PEEK ring contact pressure. As shown in FIG. 21, the contact pressure of the PEEK rings is significantly improved when foldback rings are added to the tool according to one or more embodiments of the present disclosure, as compared to just installing the PEEK rings in the support rings alone, even in instances of increasing backlash. As shown in FIG. 22, the contact pressure of the PEEK rings is significantly improved when foldback rings are added to the tool according to one or more embodiments of the present disclosure, as compared to just installing the PEEK rings in the support rings alone, even in instances of a decreasing temperature of the elastomer.

Moreover, in the tool 300 according to one or more embodiments of the present disclosure, the elastomer element 1 may be made of AFLAS®, for example, or may otherwise be highly loaded.

Language of degree used herein, such as the terms "approximately," "about," "generally," and "substantially," as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A back-up ring system, comprising:
   an outer C-ring;
   an inner C-ring that mates with the outer C-ring, the inner C-ring comprising a first rupture point; and
   a ring sheath that fits onto the inner C-ring, the ring sheath comprising:
      a cut-out region; and
      a second rupture point,
   wherein the inner C-ring further comprises a blocking segment that angularly offsets the first and second rupture points,
   wherein the cut-out region of the ring sheath mates with the blocking segment of the inner C-ring,
   wherein the ring sheath further comprises a '7' shaped cross-sectional profile, and
   wherein a lower branch of the '7' shaped cross-sectional profile is tapered.

2. The back-up ring system of claim 1,
   wherein the blocking segment spans a 45° section of the inner C-ring, and
   wherein the cut-out region spans a 47° section of the ring sheath.

3. The back-up ring system of claim 1, further comprising at least one alignment pin that connects the ring sheath to the inner C-ring.

4. The back-up ring system of claim 1, wherein the outer C-ring and the inner C-ring form a 'V' shaped profile.

5. A tool, comprising:
a mandrel;
an elastomer element;
a support ring;
the back-up ring system of claim 1, wherein the support ring is disposed between the elastomer element and the back-up ring system on the mandrel; and
a gauge ring disposed on the mandrel that supports the back-up ring system.

6. The tool of claim 5, wherein the gauge ring supports the outer C-ring of the back-up ring system.

7. The tool of claim 5, wherein the gauge ring comprises a singled chamfered corner.

8. The tool of claim 5, wherein, in a set position:
the back-up ring system is cupped evenly between the support ring and the gauge ring;
a mating face of the support ring abuts the gauge ring with face-to-face contact; and
the elastomer element and the back-up ring system bridge a gap between the mandrel and a surrounding wellbore or casing.

9. The tool of claim 8, wherein, in the set position, an outer apex of the support ring is angled and lies perpendicular to the ring sheath.

10. The tool of claim 8,
wherein the outer C-ring and the inner C-ring of the back-up ring system form a 'V' shaped profile, and
wherein the support ring comprises a parallel contact region that evenly contacts the 'V' shaped profile to stabilize the set position.

11. The tool of claim 5,
wherein the outer C-ring and the inner C-ring of the back-up ring system form a 'V' shaped profile, and
wherein the support ring comprises a top face that is perpendicular to the 'V' shaped profile.

12. The tool of claim 5, wherein the support ring comprises an inner face that is tapered to match an end of the elastomer element.

13. The tool of claim 5, further comprising:
a PEEK ring installed in the support ring; and
a foldback ring that abuts the PEEK ring,
wherein the foldback ring does not contact a surrounding wellbore or casing.

14. A method, comprising:
running the tool of claim 5 inside a wellbore; and
axially deploying and compressing the elastomer element into a set position,
wherein, in the set position, the elastomer element fills a space between the mandrel and the surrounding wellbore, creating a seal.

15. A method comprising:
running the tool of claim 13 inside a wellbore; and
axially deploying and compressing the elastomer element into a set position,
wherein, in the set position, the elastomer element fills a space between the mandrel and the surrounding wellbore, creating a seal.

16. A back-up ring system, comprising:
an outer C-ring;
an inner C-ring that mates with the outer C-ring, the inner C-ring comprising a first rupture point; and
a ring sheath that fits onto the inner C-ring, the ring sheath comprising:
a cut-out region; and
a second rupture point,
wherein the inner C-ring further comprises a blocking segment that angularly offsets the first and second rupture points,
wherein the cut-out region of the ring sheath mates with the blocking segment of the inner C-ring,
wherein the ring sheath further comprises a '7' shaped cross-sectional profile,
wherein the blocking segment spans a 45° section of the inner C-ring, and
wherein the cut-out region spans a 47° section of the ring sheath.

* * * * *